US009928653B2

(12) United States Patent
Atsmon

(10) Patent No.: US 9,928,653 B2
(45) Date of Patent: Mar. 27, 2018

(54) HEAD MOUNTED DISPLAY PRESENTATION ADJUSTMENT

(71) Applicant: Harman International Industries, Incorporated, Stamford, CT (US)

(72) Inventor: Dan Atsmon, Rehovot (IL)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/685,482

(22) Filed: Apr. 13, 2015

(65) Prior Publication Data
US 2015/0294505 A1 Oct. 15, 2015

(30) Foreign Application Priority Data

Apr. 14, 2014 (EP) .................................... 14164536

(51) Int. Cl.
*G09G 5/00* (2006.01)
*G06T 19/00* (2011.01)
(Continued)

(52) U.S. Cl.
CPC .............. *G06T 19/006* (2013.01); *B60R 1/00* (2013.01); *G02B 27/017* (2013.01); *G06F 3/012* (2013.01); *G06F 3/04815* (2013.01); *B60R 2300/205* (2013.01); *G02B 2027/014* (2013.01); *G02B 2027/0178* (2013.01); *G02B 2027/0187* (2013.01)

(58) Field of Classification Search
CPC combination set(s) only.
See application file for complete search history.

(56) References Cited

U.S. PATENT DOCUMENTS 5,953,000 A * 9/1999 Weirich ................ G01S 5/0247
345/158
6,474,159 B1 11/2002 Foxlin et al.
(Continued)

FOREIGN PATENT DOCUMENTS

GB 2347573 A 9/2000

OTHER PUBLICATIONS

Lowe, D., "Object Recognition from Local Scale-Invariant Features," Seventh IEEE International Conference on Computer Vision, vol. 2, Sep. 1999, 8 pages.
(Continued)

*Primary Examiner* — M Good Johnson
(74) *Attorney, Agent, or Firm* — McCoy Russell LLP

(57) ABSTRACT

Embodiments are disclosed for adjusting a presentation on a head-mounted display (HMD). In one or more example embodiments, a method of dynamically orienting a presentation of a HMD includes gathering HMD sensor data via at least one HMD sensor that is installed on an HMD worn by a driver of the vehicle and gathering vehicle sensor data via at least one vehicle mounted sensor mounted to the vehicle. The example method further includes performing an analysis of the HMD sensor data and of the vehicle sensor data to identify a difference between the HMD sensor data and the vehicle sensor data, and calculating, based on the difference, an orientation of the HMD device in relation to the vehicle. The method further includes adjusting a presentation of data on a display of the HMD device based on the orientation.

20 Claims, 7 Drawing Sheets

(51) Int. Cl.
  *B60R 1/00* (2006.01)
  *G06F 3/01* (2006.01)
  *G06F 3/0481* (2013.01)
  *G02B 27/01* (2006.01)

(56) References Cited

U.S. PATENT DOCUMENTS

| | | | | |
|---|---|---|---|---|
| 6,522,312 | B2* | 2/2003 | Ohshima | A63F 13/00 273/309 |
| 7,312,766 | B1* | 12/2007 | Edwards | G02B 27/017 248/115 |
| 7,337,650 | B1* | 3/2008 | Preston | B60W 40/11 73/1.38 |
| 9,547,173 | B2* | 1/2017 | Alaniz | G06F 3/011 |
| 2001/0045978 | A1 | 11/2001 | McConnell et al. | |
| 2001/0048763 | A1 | 12/2001 | Takatsuka et al. | |
| 2010/0141555 | A1* | 6/2010 | Rorberg | G02B 27/017 345/8 |
| 2010/0253593 | A1* | 10/2010 | Seder | G01S 13/723 345/7 |
| 2010/0292886 | A1* | 11/2010 | Szczerba | G01C 21/365 701/31.4 |
| 2011/0282130 | A1* | 11/2011 | Krueger | A61M 21/00 600/27 |
| 2012/0050138 | A1* | 3/2012 | Sato | B60K 35/00 345/4 |
| 2012/0242694 | A1* | 9/2012 | Hotta | G02B 27/01 345/633 |
| 2013/0004920 | A1* | 1/2013 | Pabst | G09B 9/003 434/69 |
| 2013/0076787 | A1* | 3/2013 | Mathieu | B60R 1/00 345/633 |
| 2013/0106674 | A1* | 5/2013 | Wheeler | G02B 27/017 345/8 |
| 2013/0162632 | A1* | 6/2013 | Varga | G06T 19/006 345/419 |
| 2013/0215235 | A1 | 8/2013 | Russell | |
| 2013/0222369 | A1* | 8/2013 | Huston | G06T 17/00 345/419 |
| 2014/0247286 | A1* | 9/2014 | Chi | G09G 3/003 345/672 |
| 2015/0097860 | A1* | 4/2015 | Alaniz | G06F 3/011 345/633 |
| 2015/0097864 | A1* | 4/2015 | Alaniz | G06T 19/006 345/633 |
| 2015/0100179 | A1* | 4/2015 | Alaniz | A63F 13/00 701/1 |
| 2015/0317834 | A1* | 11/2015 | Poulos | G06F 3/012 345/619 |
| 2016/0249856 | A1* | 9/2016 | Miller | A61B 5/6803 |

OTHER PUBLICATIONS

Welch, G. et al., "Motion Tracking: No Silver Bullet, but a Respectable Arsenal," IEEE Computer Graphics and Applications, vol. 22, No. 6, Nov. 2002, 15 pages.

Bock, T. et al., "Vehicle in the Loop—Ein Innovativer Ansatz Zur Kopplung Virtueller Mit Realer Erprobung," ATZ—Automobiltechnische Zeitschrift, vol. 110, No. 1, Jan. 2008, 8 pages. (See NPL 4, Extended European Search Report Issued in Application No. 14164536.6 for English Explanation of Relevance).

European Patent Office, Extended European Search Report Issued in Application No. 14164536.6, Feb. 4, 2015, Germany, 19 pages.

* cited by examiner

HEAD MOUNTED DISPLAY PRESENTATION ADJUSTMENT

CROSS REFERENCE TO RELATED APPLICATIONS

The present application claims priority to European Patent Application No. 14164536 filed on Apr. 14, 2014, which is hereby incorporated by reference in its entirety for all purposes.

FIELD AND BACKGROUND

The present disclosure, in some embodiments thereof, relates to a head mounted display orientation and, more specifically, but not exclusively, to a head mounted display orientation and presentation adjustment at a vehicle.

A head-mounted display or helmet mounted display, both abbreviated HMD, is a display device, worn on the head or as part of a helmet, that has a small display optic in front of one (monocular HMD) or each eye (binocular HMD). There is also an optical head-mounted display (OHMD), which is a wearable display that has the capability of reflecting projected images as well as allowing the user to see through it.

A typical HMD has either one or two small displays with lenses and semi-transparent mirrors embedded in a helmet, eyeglasses (also known as data glasses) or visor. The display units are miniaturized and may include CRT, LCDs, Liquid crystal on silicon (LCoS), or OLED. Some vendors employ multiple micro-displays to increase total resolution and field of view.

When presenting augmented reality (AR) objects on an HMD, the presented AR objects must correlate with the head movements of the user. This is usually established by using image sensor(s) and/or motion detector(s) located on the HMD to calculate the orientation of the HMD in relation to the surroundings and adjusting the presentation of the AR objects on the HMD based on this orientation.

Using HMD while driving has many benefits, as the HMD may be used for enhancing the driving experience with data, navigation instructions, statistics, real time messages, and notifications.

For example, some head-mounted displays allow a user to see a variety of detail points on the inner workings of the car while a traditional dashboard collection of meters gives the driver the rest of the layout per usual.

SUMMARY

According to an aspect of some embodiments of the present disclosure there is provided a method of dynamically orienting a presentation of a head-mounted display (HMD), comprising: using at least one HMD sensor which is installed on a HMD worn by a driver of a vehicle to gather HMD movement data; using at least one vehicle mounted sensor fixated to the vehicle to gather vehicle movement data; performing an analysis of the HMD movement data and of the vehicle movement data to identify a difference between the HMD movement data and the vehicle movement data; calculating, based on the difference, an orientation of the HMD device in relation to the vehicle; and adjusting a presentation of data on a display of the HMD device based on the orientation. In this way, vehicle sensor data may be correlated with HMD sensor data in order to differentiate user movement that is caused by movement of the vehicle from user movement that is independent of vehicle movement. In examples where the presentation of data on the display of the HMD is tied to objects in the vehicle, the absolute movement of the user (e.g., movement caused by both the vehicle and the user independent of the vehicle) is not as relevant as movement of the user relative to the vehicle.

In some embodiments, the at least one vehicle mounted sensor may be a component of a mobile device placed on a vehicle mount. According to some embodiments of the present disclosure there is provided a computer readable medium comprising computer executable instructions adapted to perform the method.

According to an aspect of some embodiments of the present disclosure there is provided a system for dynamically orienting a presentation of a head-mounted display (HMD), comprising: at least one HMD sensor which is installed on a HMD worn by a driver of a vehicle that gathers HMD movement data; at least one device sensor fixated to the vehicle that gathers vehicle movement data; and an analysis and calculation module for: performing an analysis of the HMD movement data and of the vehicle movement data to identify a difference between the HMD movement data and the vehicle movement data; calculating, based on the difference, an orientation of the HMD device in relation to the vehicle; and adjusting a presentation of data on a display of the HMD device based on the orientation.

Optionally, the HMD movement data and the vehicle movement data are transferred to the analysis and calculation module by wireless connection. Optionally, the analysis and calculation module is a computer program installed on the HMD. Optionally, the analysis and calculation module is a computer program installed on a mobile device. Optionally, the analysis and calculation module is a computer program installed as part of a computing device of the vehicle.

According to an aspect of some embodiments of the present disclosure there is provided a method of dynamically orienting a presentation of a head-mounted display (HMD), comprising: using at least one HMD image sensor which is installed on a HMD worn by a driver of a vehicle to capture a HMD image of a driver control area and a part of a windshield and a scenery seen through the part of the windshield and in front of the vehicle; using at least one device image sensor of an imaging device mounted on a base fixated to the vehicle to capture a vehicle image of the scenery; performing an analysis of the HMD image and of the vehicle image to identify a difference in apparent position of an object located in the scenery and depicted both in the HMD image and in the vehicle image; calculating, based on the difference, an orientation of the HMD device in relation to the vehicle; and adjusting a presentation of data on a display of the HMD device based on the orientation.

Optionally, the imaging device is a dashboard camera. Optionally, the imaging device is attached to the windshield.

According to an aspect of some embodiments of the present disclosure there is provided a system for dynamically orienting a presentation of a head-mounted display (HMD), comprising: at least one HMD image sensor which is installed on a HMD worn by a driver of a vehicle that captures a HMD image of a driver control area and a part of a windshield and a scenery seen through the part of the windshield and in front of the vehicle; at least one device image sensor of an imaging device mounted on a base fixated to the vehicle that captures a vehicle image of the scenery; and an analysis and calculation module for: performing an analysis of the HMD image and of the vehicle image to identify a difference in apparent position of an object located in the scenery and depicted both in the HMD image and in the vehicle image; calculating, based on the difference, an orientation of the HMD device in relation to the vehicle; and adjusting a presentation of data on a display of the HMD device based on the orientation.

According to an aspect of some embodiments of the present disclosure there is provided a method of dynamically orienting a presentation of a head-mounted display (HMD), comprising: measuring a current HMD device motion using at least one HMD device motion detector installed in a HMD device worn by a driver of a vehicle; measuring a current vehicle motion using at least one vehicle motion detector which is installed in the vehicle; performing an analysis of the current HMD device motion and of the current vehicle motion to identify a difference between the current vehicle motion and the current HMD device motion; calculating, based on the difference, an orientation of the HMD device in relation to the vehicle; and adjusting a presentation of data on a display of the HMD device based on the orientation.

Optionally, the method further comprises: using at least one HMD image sensor which is installed on a HMD worn by a driver of a vehicle to capture a HMD image of a driver control area and a part of a windshield and a scenery seen through the part of the windshield and in front of the vehicle; using at least one device image sensor of an imaging device mounted on a base fixated to the vehicle to capture a vehicle image of the scenery; wherein the performing includes an analysis of the HMD image and of the vehicle image to identify a difference in apparent position of an object located in the scenery and depicted both in the HMD image and in the vehicle image; and wherein the calculating is also based on the difference in apparent position.

Optionally, the method further comprises: using at least one HMD image sensor which is installed on a HMD worn by a driver of a vehicle to capture a HMD image of a driver control area comprising a set of size known markers arranged in a known arrangement; wherein the performing includes an analysis of the HMD image to identify a an apparent position and size of each member of the set of size known markers in the HMD image; and wherein the calculating is also based on the apparent position.

According to an aspect of some embodiments of the present disclosure there is provided a system for dynamically orienting a presentation of a head-mounted display (HMD), comprising: at least one HMD device motion detector installed in a HMD device worn by a driver of a vehicle that measures a current HMD device motion; at least one vehicle motion detector which is installed in the vehicle that measures a current vehicle motion; and an analysis and calculation module for: performing an analysis of the current HMD device motion and of the current vehicle motion to identify a difference between the current vehicle motion and the current HMD device motion; calculating, based on the difference, an orientation of the HMD device in relation to the vehicle; and adjusting a presentation of data on a display of the HMD device based on the orientation.

According to an aspect of some embodiments of the present disclosure there is provided a method of dynamically orienting a presentation of a head-mounted display (HMD), comprising: using at least one HMD image sensor which is installed on a HMD worn by a driver of a vehicle to capture a HMD image of a driver control area comprising a set of size known markers arranged in a known arrangement; performing an analysis of the HMD image to identify a an apparent position and size of each member of the set of size known markers in the HMD image; calculating, based on the apparent position and size of each member of the set of size known markers, an orientation of the HMD device in relation to the vehicle; and adjusting a presentation of data on a display of the HMD device based on the orientation. Optionally, the apparent position and size of each member of the set of size known markers is detected using a Scale-invariant feature transform (SIFT) process.

According to an aspect of some embodiments of the present disclosure there is provided a system for dynamically orienting a presentation of a head-mounted display (HMD), comprising: a driver control area comprising a set of size known markers arranged in a known arrangement; at least one HMD image sensor which is installed on a HMD worn by a driver of a vehicle that captures a HMD image of the a driver control area; and an analysis and calculation module for: performing an analysis of the HMD image to identify a an apparent position and size of each member of the set of size known markers in the HMD image; calculating, based on the apparent position and size of each member of the set of size known markers, an orientation of the HMD device in relation to the vehicle; and adjusting a presentation of data on a display of the HMD device based on the orientation.

According to an aspect of some embodiments of the present disclosure there is provided a method of dynamically orienting a presentation of a head-mounted display (HMD), comprising: using at least one HMD image sensor and at least one HMD device motion detector which are installed on a HMD worn by a driver of a vehicle to capture a HMD image of a driver control area and a part of a windshield and a scenery seen through the part of the windshield and in front of the vehicle and to measure a current HMD device motion; using at least one device image sensor of an imaging device and at least one vehicle motion detector which are fixated to the vehicle to capture a vehicle image of the scenery and to measure a current vehicle motion; using the at least one HMD image sensor to capture a marking image of a driver control area comprising a set of size known markers arranged in a known arrangement; performing an analysis to identify: a difference in apparent position of an object located in the scenery and depicted both in the HMD image and in the vehicle image; a difference between the current vehicle motion and the current HMD device motion; and an apparent position and size of each member of the set of size known markers in the marking image; calculating, based on the differences and the apparent position, an orientation of the HMD device in relation to the vehicle; and adjusting a presentation of data on a display of the HMD device based on the orientation.

According to an aspect of some embodiments of the present disclosure there is provided a system for dynamically orienting a presentation of a head-mounted display (HMD), comprising: a driver control area comprising a set of size known markers arranged in a known arrangement; at least one HMD image sensor which is installed on a HMD worn by a driver of a vehicle that captures a HMD image of a driver control area and a part of a windshield and a scenery seen through the part of the windshield and in front of the vehicle; and captures a marking image of the a driver control area; at least one HMD device motion detector installed in the HMD device that measures a current HMD device motion; at least one device image sensor of an imaging device mounted on a base fixated to the vehicle that captures a vehicle image of the scenery; at least one vehicle motion detector which is installed in the vehicle that measures a current vehicle motion; and an analysis and calculation module for: performing an analysis to identify: a difference in apparent position of an object located in the scenery and depicted both in the HMD image and in the vehicle image; a difference between the current vehicle motion and the current HMD device motion; and an apparent position and size of each member of the set of size known markers in the marking image; calculating, based on the differences and the apparent position, an orientation of the HMD device in relation to the vehicle; and adjusting a presentation of data on a display of the HMD device based on the orientation.

According to an aspect of some embodiments of the present disclosure there is provided a method of capturing a stereoscopic image, comprising: using at least one head-mounted display (HMD) image sensor which is installed on a HMD worn by a driver of a vehicle to capture a HMD image of a driver control area and a part of a windshield and a scenery seen through the part of the windshield and in front of the vehicle; using at least one vehicle image sensor of a imaging device mounted on a base fixated to the vehicle to capture a vehicle image of the scenery; combining between the HMD image and of the vehicle image to create a stereoscopic image.

According to an aspect of some embodiments of the present disclosure there is provided a system for of capturing a stereoscopic image, comprising: at least one HMD image sensor which is installed on a HMD worn by a driver of a vehicle that captures a HMD image of a driver control area and a part of a windshield and a scenery seen through the part of the windshield and in front of the vehicle; at least one device image sensor of an imaging device mounted on a base fixated to the vehicle that captures a vehicle image of the scenery; and an analysis and calculation module for combining between the HMD image and of the vehicle image to create a stereoscopic image.

Although methods and materials similar or equivalent to those described herein may be used in the practice or testing of embodiments of the disclosure, exemplary methods, and/or materials are described below. In case of conflict, the patent specification, including definitions, will control. In addition, the materials, methods, and examples are illustrative only and are not intended to be necessarily limiting.

Implementation of the method and/or system of embodiments of the disclosure may involve performing or completing selected tasks manually, automatically, or a combination thereof. Moreover, according to actual instrumentation and equipment of embodiments of the method and/or system of the disclosure, several selected tasks may be implemented by hardware, by software, by firmware, or by a combination thereof using an operating system. For example, one or more of the methods described in the disclosure may be performed by a processor executing stored instructions in combination with one or more other hardware elements.

For example, hardware for performing selected tasks according to embodiments of the disclosure may be implemented as a chip or a circuit. As software, selected tasks according to embodiments of the disclosure may be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some non-limiting embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In the drawings.

DETAILED DESCRIPTION

Figure 1:
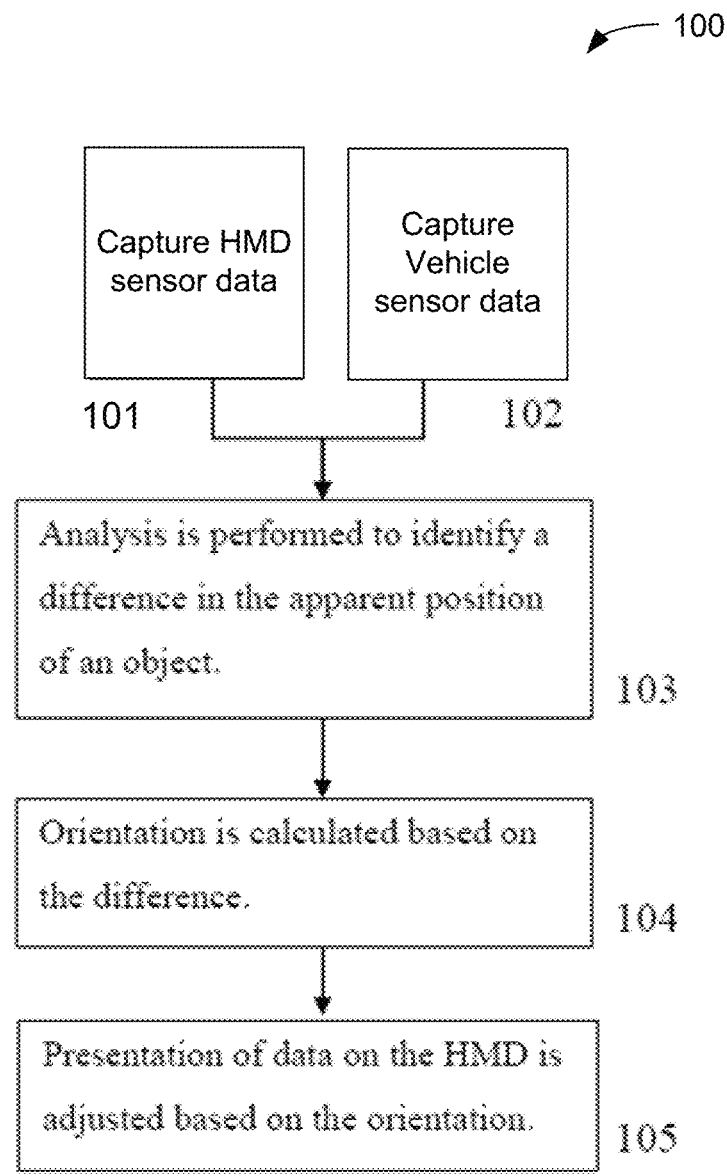
FIG. 1 is a flowchart schematically representing a method of dynamically orienting a presentation of a HMD based on data from a HMD sensor and data from a vehicle sensor, according to one or more embodiments of the present disclosure.

The present disclosure, in some embodiments thereof, relates to a head mounted display orientation and, more specifically, but not exclusively, to a head mounted display orientation and presentation adjustment at a vehicle. When presenting data, such as augmented reality (AR) objects on a head-mounted display, a helmet mounted display (HMD) or an optical head-mounted display (OHMD) when the user is driving a vehicle, the presented AR objects may be better understood when correlated with the head movements of the user and with the movements of the car. Regular orientation methods to calculate the orientation of the HMD in relation to the surroundings may not be accurate because the orientation of the HMD in relation to the vehicle is typically not considered.

According to some embodiments of the present disclosure, there are provided methods and systems of dynamically orienting in real time a presentation of a HMD worn by a driver of a vehicle by analyzing data collected from sensors, such as image sensor(s) and/or motion detector(s), to calculate the orientation of the HMD in relation to the vehicle, and adjusting the presentation based on this orientation. The data collection, orientation calculation, and/or adjustment of presentation may be performed continuously (e.g., repeated at regular intervals and/or with only processing delays between iterations) as the orientation changes throughout the driving. According to some embodiments of the present disclosure, the orientation is calculated based on a combination of data from a sensor which is located on the HMD with data from a sensor which is mounted on a vehicle driven by a user that wears (e.g., is wearing at the time of calculation) the HMD. The methods allow aligning the presentation while the user is driving, reducing trembling, presentation misalignment, and artifacts by taking into account data from a plurality of physically disconnected sensors, each gathering image and/or movement data of the user or the vehicle. The combination of sensor data allows the effect of the vehicle movement to be reduced, providing the user with a more reliable presentation of data such as speed, distance, and direction indicators, overlays of application information and scenery enhancing layers such as line markers, road delimiting graphics, and/or the other augmentation elements.

According to some embodiments of the present disclosure, an HMD image sensor is used to capture a HMD image of a driver control area, a part of a windshield and a scenery seen through the part of the windshield and in front of the vehicle. Also, an imaging device mounted on the vehicle may be used to capture a vehicle image of the same scenery from the perspective of the vehicle's imaging device (which may be different from the perspective of the HMD image sensor). An analysis of the HMD image and the vehicle image is then performed to identify a difference in the apparent position of an object located in the scenery and depicted both images, and the orientation is calculated based on this difference.

According to some embodiments of the present disclosure, a current HMD device motion is measured using a motion detector installed in (e.g., integrated in and/or mounted to) the HMD device and a current vehicle motion is measured using a motion detector installed in (e.g., integrated in and/or mounted to) the vehicle. The orientation may then be calculated based on a difference between the current vehicle motion and the current HMD device motion. According to some embodiments of the present disclosure, an HMD image sensor is used to capture an HMD image of a driver control area comprising a set of size known markers arranged in a predetermined arrangement. An analysis of the HMD image may then be performed to identify an apparent position and size of each member of the set of markers in the HMD image, optionally by using a Scale-invariant feature transform (SIFT) process, and the orientation may be calculated based on the apparent position and size. According to some embodiments of the present disclosure, an HMD image of a scenery and a vehicle image of the same scenery may be combined to create a stereoscopic image that may be used for AR and/or other purposes.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the examples. The disclosure is capable of other embodiments or of being practiced or carried out in various ways.

The present disclosure may be a system, a method, and/or a computer program product. The computer program product may include a computer readable storage medium (or media, e.g., a non-transitory computer readable medium or media) having computer readable program instructions stored thereon for causing a processor to carry out aspects of the present disclosure in combination with one or more other hardware elements.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device may receive computer readable program instructions from the network and forward the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices or combinations of devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Figure 2:
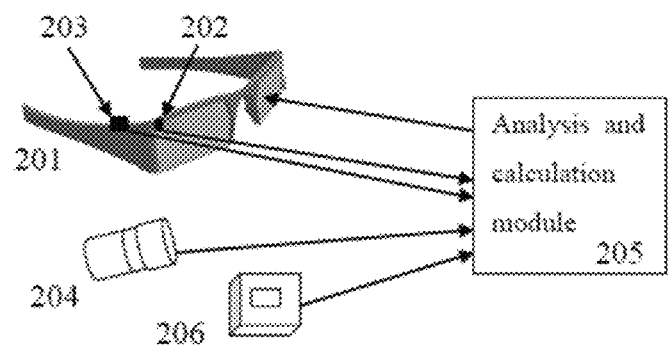
FIG. 2 is a schematic illustration of a system for dynamically orienting a presentation of a HMD, according to one or more embodiments of the present disclosure.
Figure 3:
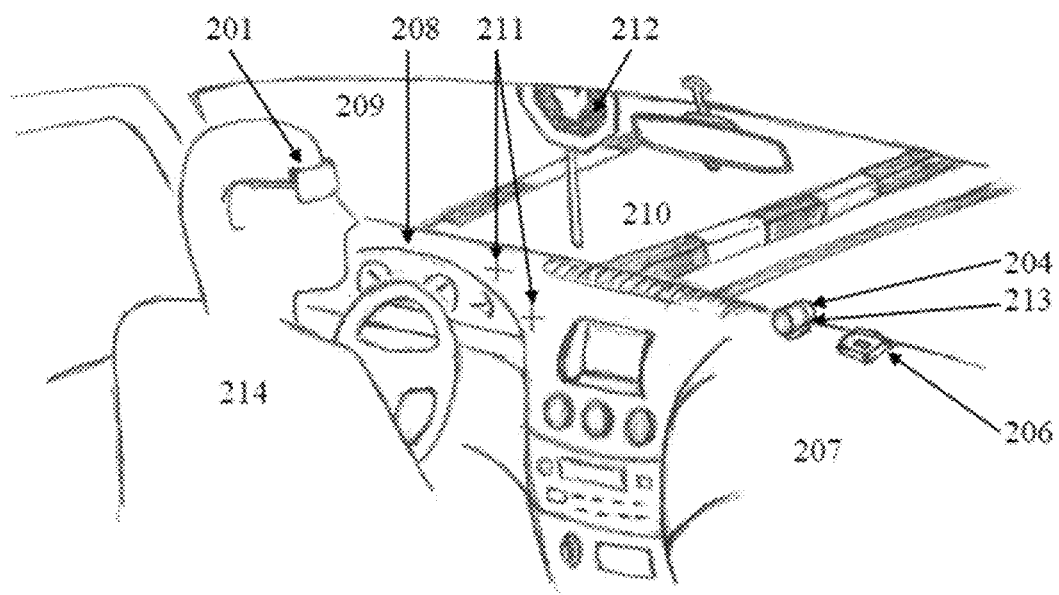
FIG. 3 is a schematic illustration of an exemplary setting of a vehicle when using a system for dynamically orienting a presentation of a HMD based on data from a HMD sensor and a vehicle sensor, according to one or more embodiments of the present disclosure.

Referring now to the drawings, FIG. 1 is a flowchart schematically representing a method of dynamically orienting a presentation of a HMD in real time based on a combination of data from a sensor which is located on the HMD with data from a sensor which is mounted on a vehicle driven by a user which wears the HMD, according to some embodiments of the present disclosure. Reference is also made to FIG. 2, which is a schematic illustration of a system for dynamically orienting a presentation of a HMD based on data from a HMD sensor and a vehicle sensor, according to some embodiments of the present disclosure. Reference is also made to FIG. 3, which is a schematic illustration of an exemplary setting of a vehicle when using a system for dynamically orienting a presentation of a HMD, according to some embodiments of the present disclosure.

First, as shown at 101 of FIG. 1, method 100 includes gathering HMD sensor data or information suggesting the position and orientation of a HMD device (e.g., HMD device 201, worn by a driver 214 of a vehicle 207 of FIG. 2) by sensor(s) that are installed on the HMD device, such as one or more image sensors and/or motion detectors of the HMD device.

As shown at 102 of FIG. 1, method 100 also includes gathering vehicle data or information suggesting the position and orientation of a vehicle (e.g., vehicle 207, driven by driver 214 which wears HMD device 201 of FIG. 2), by sensor(s) that may be attached to the vehicle and/or mounted on a base (e.g., base 213 of FIG. 2) that may be further attached to the vehicle, such as one or more image sensors and/or motion detectors of the vehicle. The sensors may be, for example, attached to the body of the vehicle, a part of a mobile device positioned on a car mount such as a smartphone, a part of a system of the vehicle, and/or a device that receives motion information from a system of the vehicle. The sensors may be attached to a driver control area (e.g., driver control area 208 of FIG. 2), which may be the section of the vehicle where information of the operation of the vehicle is presented to the driver, for example on a dashboard. Additionally, vehicle data may further include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information, a climate control related information, and/or other vehicle system related information may be communicated, and a multimedia data network through which multimedia data is communicated between multimedia components in the vehicle). For example, vehicle data may include data retrieved from the CAN bus including the current speed of the vehicle estimated by the wheel sensors, a power state of the vehicle via a battery and/or power distribution system of the vehicle, an ignition state of the vehicle, etc.

Then, as shown at 103 and 104, analysis is performed by analysis and calculation module 205 on the gathered information to identify a difference between the information gathered by sensor(s) that are installed on HMD 201 and the information gathered by sensor(s) that are attached to vehicle 207.

Analysis and calculation module 205 may be a computer program. The program may be installed, for example, on HMD device 201, on a mobile device such as a smartphone and/or a tablet computer, as part of the computing devices of vehicle 207, on a remote server and/or on any other device. Alternately and/or additionally, the analysis and calculation may be performed in an in-vehicle computing system. For example, the analysis and calculation module 205 may include instructions stored on a storage device of the HMD device 201 and/or an in-vehicle computing system that, when executed by a processor of the associated device/system, performs one or more analysis and/or calculation described above and/or below. The gathered information may be transferred from the sensors to analysis and calculation module 205, for example, by a wireless connection such as wireless local area network (WLAN) protocol such as Wireless Fidelity (WiFi™), a wireless personal area network (WPAN) such as Bluetooth™ protocol and/or a cellular network, by a wire connection such as local area network (LAN) and/or by any other connection.

Then, as shown at 404, the orientation of HMD device 201 in relation to vehicle 207 is calculated by analysis and calculation module 205 based on the difference. The calculation may include correlation and/or transformation algorithms. The algorithms may further include an affine transformation and/or perspective transformation between the images, or three-dimensional translation algorithms for example.

Finally, as shown at 105, a presentation of data on a display of HMD device 201 is adjusted based on the orientation. When analysis and calculation module 205 is not installed on HMD device 201, the analysis may be performed remotely and the orientation may be sent to HMD device 201 by any kind of wireless connection. The presented data may include AR objects, visual information, written information, and/or any other element. The resulting adjustment of orientation includes head movements of the driver as well as movements of the car.

Figure 4:
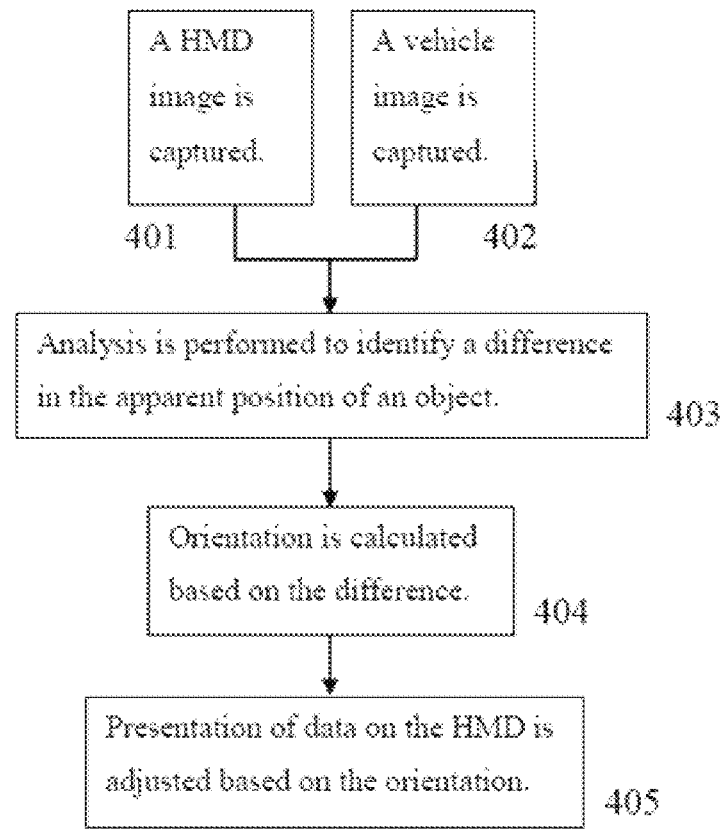
FIG. 4 is a flowchart schematically representing a method of dynamically orienting a presentation of a HMD using image sensors, according to one or more embodiments of the present disclosure.
Figure 5:
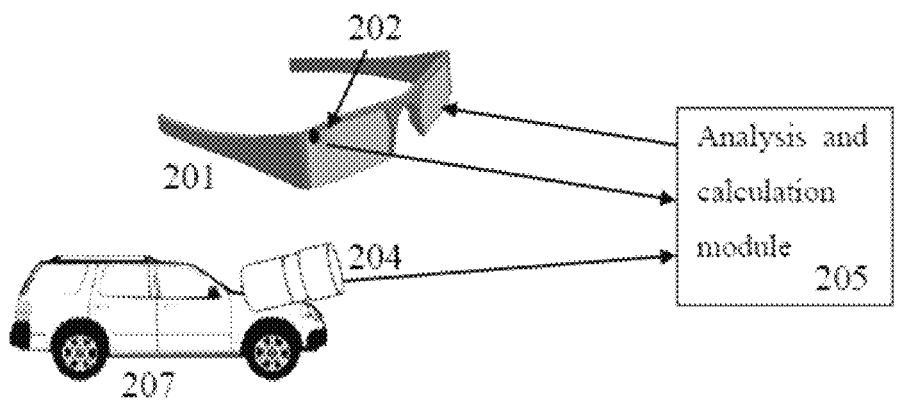
FIG. 5 is a schematic illustration of a system for dynamically orienting a presentation of a HMD using image sensors, according to one or more embodiments of the present disclosure.

Reference is now made to FIG. 4, which is a flowchart schematically representing a method of dynamically orienting a presentation of a HMD using one or more image sensors (e.g., HMD image sensors) according to some embodiments of the present disclosure. Reference is also made to FIG. 5, which is a schematic illustration of a system for dynamically orienting a presentation of a HMD using image sensors, according to some embodiments of the present disclosure.

First, as shown at 401, at least one HMD image sensor (e.g., HMD image sensor 202, such as a miniature camera, which is installed on HMD 201) is used to capture a HMD image of a driver control area 208, a part of a windshield 209 and a scenery 210 seen through the part of windshield 209 and in front of vehicle 207. Scenery 210 may include the road ahead of vehicle 207 and any other object in the path of the vehicle, such as road signs, traffic signals, etc.

Also, as shown at 402, at least one device image sensor of an imaging device 204 mounted on a base 213 fixated to vehicle 207 is used to capture a vehicle image of scenery 210. Imaging device 204 may be, for example, a dashboard camera, a camera attached to windshield 209, a camera of a mobile device positioned on a car mount and/or any other camera or image capturing device. For example, image sensor 204 may be configured to image (e.g., positioned and oriented and include a field of view capable of imaging) details of the environment of the vehicle such as location of the vehicle, objects in the path of the vehicle as seen by the driver, etc.

Then, as shown at 403, an analysis is performed of the HMD image and of the vehicle image to identify a difference in the apparent position of an object 212 located in scenery 210 and depicted both in the HMD image and in the vehicle image. Object 212 may be, for example, a curbstone, a signpost, a tree, another vehicle and/or any other stationary or moving object located in front of vehicle 207. The position of object 212 may be detected, for example, by using an algorithm designed to detect and describe local features in images, such as scale-invariant feature transform (SIFT) process and/or Viola-Jones object detection framework optionally combined with support vector machine (SMV) algorithm for classification of features, Speeded Up Robust Features (SURF), Gradient Location and Orientation Histogram (GLOH), Histogram of Oriented Gradients (HOG). Then, as shown at 404, the orientation of HMD device 201 in relation to vehicle 207 is calculated based on the difference. This may be performed by an algorithm implemented in analysis and calculation module 205, designed to calculate the relative position of a camera based on positions of objects. The algorithm may be, for example, an affine transformation and/or perspective transform between the view points of the two images. Finally, as shown at 405, a presentation of data on a display of HMD device 201 is adjusted based on the orientation, as described above.

For example, if the vehicle image shows a signpost, while the HMD image shows only a portion of the same signpost, then the analysis performed at 403 may infer that the driver is turning his head in such a way that only a portion of the signpost is in his view. At 404, a perspective transformation may be performed on the two images to determine a difference between the two images, for example. Subsequently, at 405 the presentation of the HMD image and the vehicle image may be adjusted to ensure that displayed objects maintain a corrected position relative to a real-world object based on the calculated orientation and the combined data may be presented on the HMD.

Figure 6:
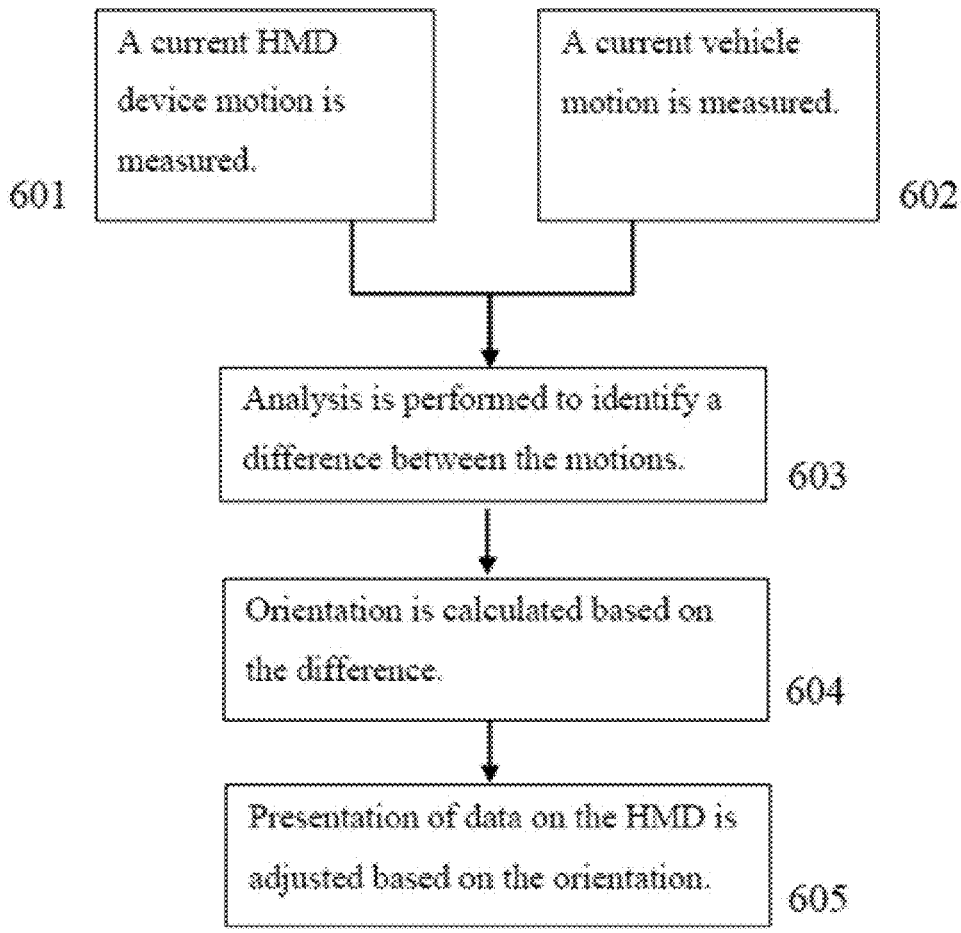
FIG. 6 is a flowchart schematically representing a method of dynamically orienting a presentation of a HMD using motion detectors, according to one or more embodiments of the present disclosure.
Figure 7:
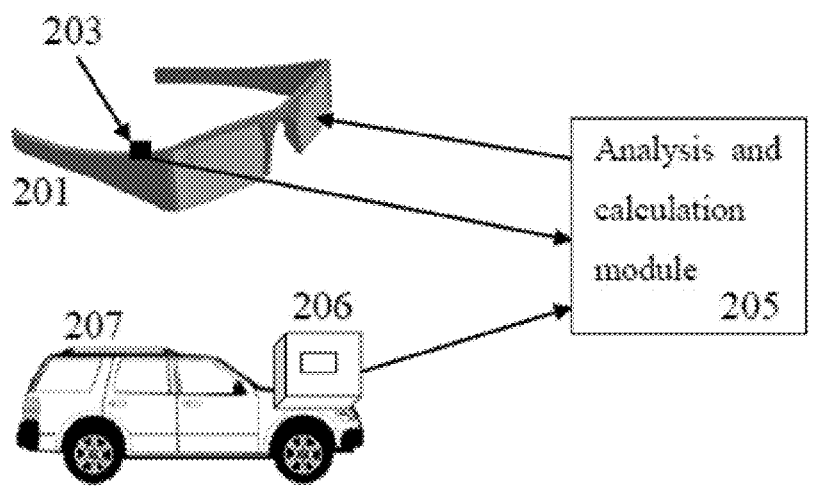
FIG. 7 is a schematic illustration of a system for dynamically orienting a presentation of a HMD using motion detectors, according to one or more embodiments of the present disclosure.

Reference is now made to FIG. 6 which is a flowchart schematically representing a method of dynamically orienting a presentation of a HMD using motion detectors, according to some embodiments of the present disclosure. Reference is also made to FIG. 7, which is a schematic illustration of a system for dynamically orienting a presentation of a HMD using motion detectors, according to some embodiments of the present disclosure.

First, as shown at 601, a current HMD device motion is measured using at least one HMD device motion detector 203 installed in HMD device 201. Motion detector 203 may be, for example, an accelerometer, gyro, and/or compass.

Also, as shown at 602, a current vehicle motion is measured using at least one vehicle motion detector 206 which is installed in vehicle 207. Motion detector 206 may be, for example, an accelerometer attached to the body of vehicle 207, a mobile device positioned on a car mount and/or a device that receives motion information from a system of vehicle 207.

Then, as shown at 603, an analysis is performed of the current HMD device motion and of the current vehicle motion to identify a difference between the current motions. The difference may be calculated, for example, by using an algorithm designed to calculate the current relative motion between HMD device 201 and vehicle 207. The algorithm may, for example, subtract each dimension component (x,y, z) of the current HMD device motion from each dimension component of the current vehicle motion to calculate a relative motion in each dimension.

Then, as shown at 604, the orientation of HMD device 201 in relation to vehicle 207 is calculated based on the difference between the current HMD device motion and the current vehicle motion. The calculation may include, for example, a three-dimensional translation function. Finally, as shown at 605, a presentation of data on a display of HMD device 201 is adjusted based on the orientation, as described above.

Optionally, the method of dynamically orienting a presentation of a HMD using motion detectors is alternative or cumulative to the method of dynamically orienting a presentation of a HMD using image sensors. Data from image sensors and motion detectors may be combined or compared to increase the accuracy of the calculated orientation.

Figure 8:
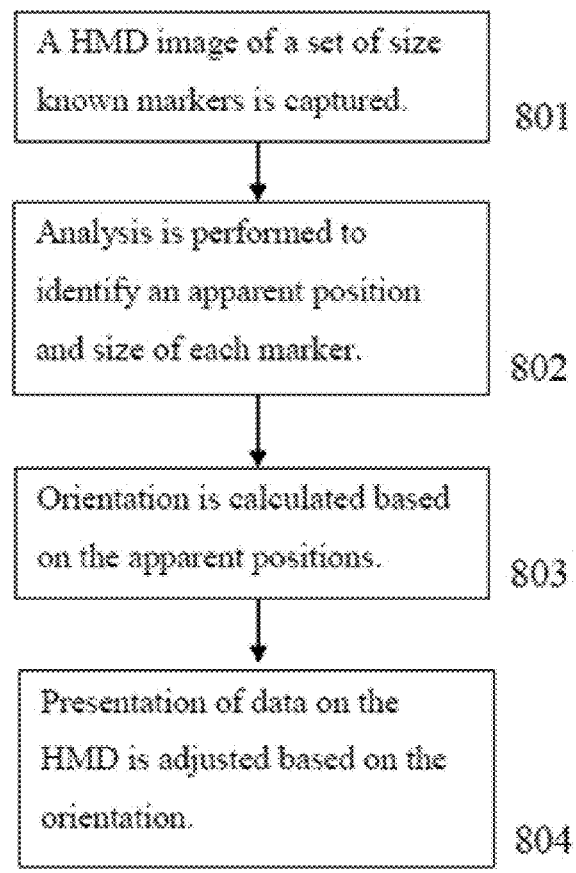
FIG. 8 is a flowchart schematically representing a method of dynamically orienting a presentation of a HMD using a set of size known markers, according to one or more embodiments of the present disclosure.
Figure 9:
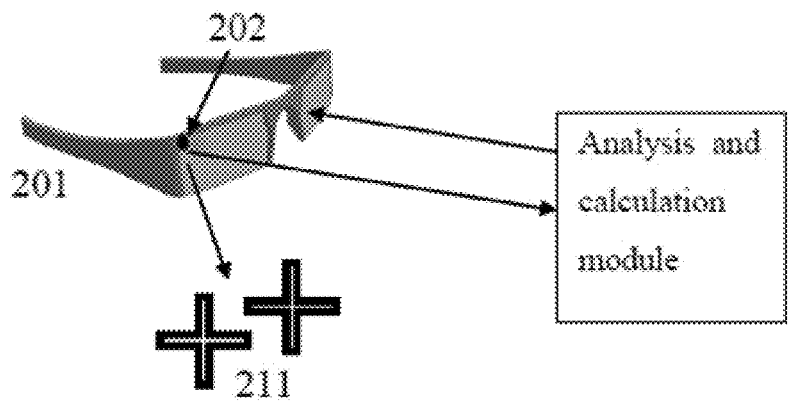
FIG. 9 is a schematic illustration of a system for dynamically orienting a presentation of a HMD using a set of size known markers, according to one or more embodiments of the present disclosure.

Reference is now made to FIG. 8, which is a flowchart schematically representing a method of dynamically orienting a presentation of a HMD using a set of size-known markers, according to some embodiments of the present disclosure. Reference is also made to FIG. 9, which is a schematic illustration of a system for dynamically orienting a presentation of a HMD using a set of size-known markers, according to some embodiments of the present disclosure.

First, as shown at 801, image sensor 202 is used to capture a HMD image of driver control area 208 comprising a set of size known markers 211 arranged in a known arrangement. The markers may be, for example, shapes such as an X or O, numbers and/or any other mark usable by an image processing algorithm. The markers may be positioned and arranged at any location on driver control area 208 that is visible to image sensor 204.

Then, as shown at 802, an analysis is performed of the HMD image to identify an apparent position and size of each marker 211 in the HMD image. The apparent position and size of each marker 211 may be detected, for example, by using an algorithm designed to detect and describe local features in images, such as a SIFT process or other suitable process, including object recognition, robotic mapping and navigation, image stitching, 3-D modelling, gesture recognition, video tracking, etc.

Then, as shown at 803, the orientation of HMD device 201 in relation to vehicle 207 is calculated based on the apparent position and size of each marker 211. This may be performed by an algorithm implemented in analysis and calculation module 205, designed to calculate the relative position of a camera based on positions of objects, for example, by triangulation. Finally, as shown at 804, a presentation of data on a display of HMD device 201 is adjusted based on the orientation, as described above. For example, a location of a virtual object may be moved by an amount based on the differences between the apparent position of the object and the current vehicle and HMD device motion responsive to determining that the data on the display comprises a virtual object tied to a real-world object inside of the vehicle. In this way, movement of the HMD device relative to the vehicle, which may cause a change in a perceived location of a real-world object inside of the vehicle (e.g., when turning his/her head from left to right, an instrument panel that was located to the right of the user's perspective may be shifted to the left of the user's perspective), may be used to determine how a virtual object tied to that real-world object is to be shifted to maintain the same relative position (relative to the real-world object).

In one example, a driver may attempt to park the vehicle along the curb in a busy street. In accordance with the above-described method, the HMD image data may include an image of the vehicle in front and an image of the curb, in addition to the image of the set of markers. By knowing the distance between the markers, the relative distance between the vehicle with respect to the vehicle in front of it and the distance from the curb may be determined. Presentation of data on the HMD may be adjusted based on the calculated relative distances.

Optionally, the method of dynamically orienting a presentation of a HMD using a set of size known markers may be combined with the method of dynamically orienting a presentation of a HMD using motion detectors and/or with the method of dynamically orienting a presentation of a HMD using image sensors. Data of apparent position and size markers 211 may be combined or compared to data to data of difference in the apparent position of an object 212 and/or data of difference between the current motions of HMD device 201 and vehicle 207, to increase the accuracy of the calculated orientation.

Figure 10:
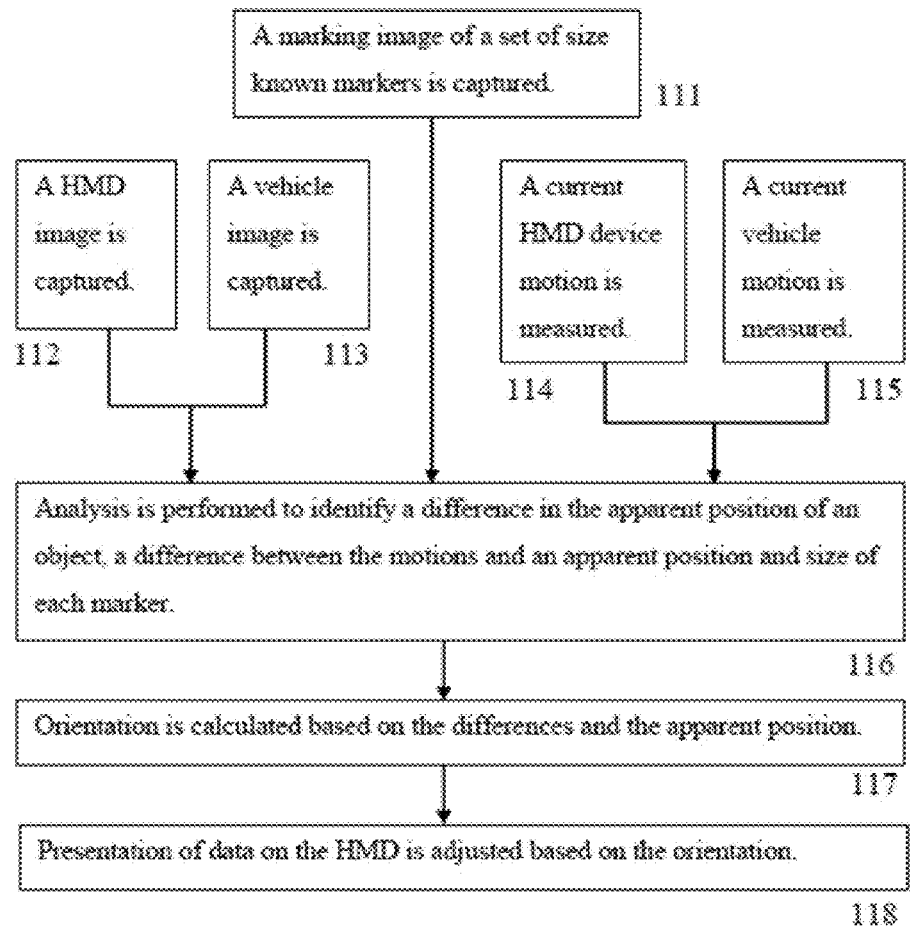
FIG. 10 is a flowchart schematically representing a method of dynamically orienting a presentation of a HMD using image sensors, motion detectors and/or a set of size known markers, according to one or more embodiments of the present disclosure.
Figure 11:
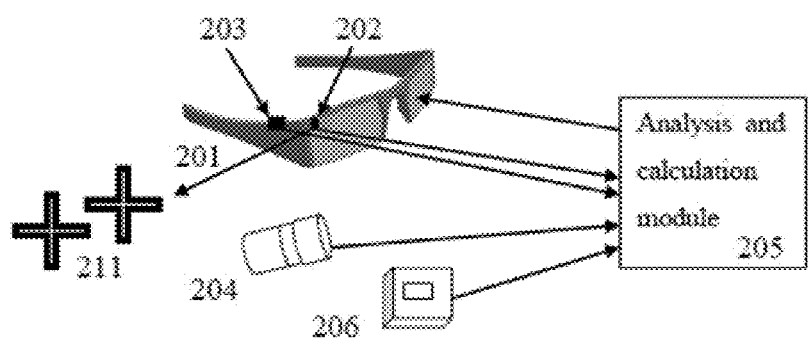
FIG. 11 is a schematic illustration of a system for dynamically orienting a presentation of a HMD using image sensors, motion detectors and/or a set of size known markers, according to one or more embodiments of the present disclosure.

Reference is now made to FIG. 10, which is a flowchart schematically representing a method of dynamically orienting a presentation of a HMD using image sensors, motion detectors, and/or a set of size known markers, according to some embodiments of the present disclosure. Reference is also made to FIG. 11, which is a schematic illustration of a system for dynamically orienting a presentation of a HMD using image sensors, motion detectors and/or a set of size known markers, according to some embodiments of the present disclosure.

First, as shown at 111-115, image sensors are used to capture a HMD image and a vehicle image of scenery 210 and/or to capture a marking image of markers 211; and the motion detector are used to measure a current HMD device motion and a current vehicle motion, as described above. The vehicle data may further include information from CAN (e.g., engine operating conditions, vehicle state, vehicle speed/acceleration, vehicle location, etc.), for example. The information captured by the image sensor(s) may include images of scenery 210, an image of markers 211 or both.

Then, as shown at 116-117, an analysis is performed to identify a difference in the apparent position of an object 212, a difference between the motions and/or an apparent position and size of each marker 211, and the orientation of HMD device 201 in relation to vehicle 207 is calculated, as described above. Optionally, the information captured by the image sensors (i.e. the difference in the apparent position of an object 212 and the apparent position and/or size of each marker 211) indicates slower movements of HMD device 201 in relation to vehicle 207 then the information measured by the motion detectors (i.e. the difference between the motions). The information measured by the motion detectors indicates vibration of high frequency, for example, 1 kilohertz.

Optionally, the slower movements identified from the information captured by the image sensors are combined with the faster movements identified from the information measured by the motion detectors. Optionally, near future movements are predicted by using an algorithm to analyze the slower movements and the faster movements.

Finally, as shown at 118, a presentation of data on a display of HMD device 201 is adjusted based on the orientation, as described above. Optionally, the slower movements are averaged with the faster movements, for example, by a weighted average over time. This may result in smother changes of the calculated orientation over time.

Figure 12:
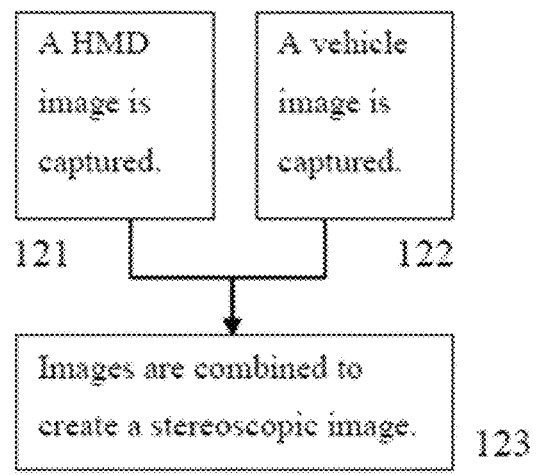
FIG. 12 is a flowchart schematically representing a method of capturing a stereoscopic image based on data from a HMD sensor and a vehicle sensor, according to one or more embodiments of the present disclosure.
Figure 13:
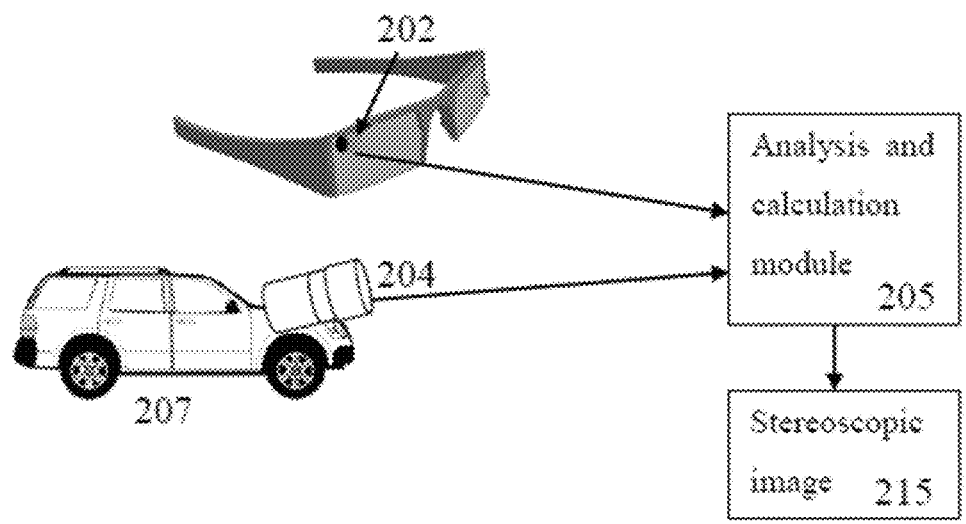
FIG. 13 is a schematic illustration of a system for capturing a stereoscopic image based on data from a HMD sensor and a vehicle sensor, according to one or more embodiments of the present disclosure.

Reference is now made to FIG. 12 which is a flowchart schematically representing a method of capturing a stereoscopic image based on data from a HMD sensor and a vehicle sensor, according to some embodiments of the present disclosure. Reference is also made to FIG. 13, which is a schematic illustration of a system for capturing a stereoscopic image based on data from a HMD sensor and a vehicle sensor, according to some embodiments of the present disclosure.

First, as shown at 121, at least one HMD image sensor 202 which is installed on HMD 201 is used to capture a HMD image of a driver control area 208, a part of a windshield 209 and a scenery 210 seen through the part of windshield 209 and in front of vehicle 207, as described above. Also, as shown at 122, at least one device image sensor of an imaging device 204 mounted on a base 213 fixated to vehicle 207 is used to capture a vehicle image of scenery 210, as described above.

Then, as shown at 123, the HMD image and the vehicle image are combined to create a stereoscopic image 215. The HMD image and the vehicle image depict two slightly different views of the same scenery, and therefore are compatible for creating a stereoscopic image. The creation of stereoscopic image 215 may be performed by an algorithm implemented in analysis and calculation module 205. Stereoscopic image 215 may be used for AR presentation, driving simulation and/or any other purpose.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions. The methods may be performed by executing stored instructions with one or more logic devices (e.g., processors) in combination with one or more additional hardware elements, such as storage devices, memory, hardware network interfaces/antennas, switches, actuators, clock circuits, etc. For example, unless otherwise noted, one or more of the described methods may be performed by a suitable device and/or combination of devices, such as a processor of an HMD or in-vehicle computing system executing stored instructions to control one or more image sensors.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant head mounted display devices will be developed and the scope of the term head mounted display is intended to include all such new technologies a priori. The terms "comprises", "comprising", "includes", "including", "having" and their conjugates mean "including but not limited to". This term encompasses the terms "consisting of" and "consisting essentially of". The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The invention claimed is:

1. A method of dynamically orienting a presentation of a head-mounted display (HMD), comprising:
   gathering HMD sensor data via at least one HMD sensor installed on an HMD worn by a driver of a vehicle, the HMD sensor data comprising an HMD image captured by the at least one HMD sensor installed on the HMD worn by the driver;
   gathering vehicle sensor data via at least one vehicle-mounted sensor mounted on the vehicle;
   performing an analysis of each of said HMD sensor data and of said vehicle sensor data to identify a difference between said HMD sensor data and said vehicle sensor data by identifying a difference in an apparent position of an object located in an environment of the vehicle and included in each of the HMD image and a vehicle image captured by the at least one vehicle-mounted sensor;
   calculating, based on said difference, an orientation of said HMD in relation to said vehicle; and
   adjusting a presentation of data on a display of said HMD based on said orientation.

2. The method of claim 1, wherein the vehicle sensor data comprises the vehicle image, and wherein the at least one HMD sensor is installed on a location of the HMD that is positioned at a front or side region of a head of the driver when the HMD is worn by the driver.

3. The method of claim 2, wherein the HMD image includes a driver control area and a scenery seen through at least part of a windshield of the vehicle, wherein the vehicle image includes at least a portion of the scenery imaged from a perspective of the vehicle sensor, and wherein the object is located in the scenery.

4. The method of claim 2, wherein the HMD image includes a driver control area comprising a set of size-known markers arranged in a predetermined arrangement, and where performing the analysis of the HMD sensor data comprises identifying an apparent size of each member of the set of size-known markers in the HMD image.

5. The method of claim 4, wherein identifying an apparent position and size of each member of the set of size-known markers comprises detecting the apparent position and size of each member of the set of size-known markers using a Scale-invariant feature transform (SIFT) process.

6. The method of claim 2, further comprising combining each of the HMD image and the vehicle image to create a stereoscopic image, wherein the vehicle image and the HMD image depict two different views of same scenery.

7. The method of claim 1, wherein the at least one HMD sensor includes a motion detector installed on the HMD worn by the driver and the HMD sensor data comprises a current measured HMD device motion determined via at least one HMD device motion detector, wherein the vehicle sensor data comprises a current measured vehicle motion determined via at least one vehicle motion detector, and wherein performing the analysis of the HMD sensor data and the vehicle sensor data further comprises identifying a difference between the current HMD device motion and the current vehicle motion, the motion detector including one or more of an accelerometer, a gyroscope, and a compass.

8. The method of claim 7, further comprising capturing the HMD image, via at least one HMD image sensor installed on the HMD, of a driver control area and a scenery seen through part of a windshield of the vehicle, capturing the vehicle image, via at least one vehicle imaging device mounted on the vehicle, of at least a portion of the scenery, wherein performing the analysis of the HMD sensor data and the vehicle sensor data further comprises identifying a difference between an apparent position of an object located in the scenery and imaged in both the HMD image and the vehicle image, and wherein calculating the orientation is further based on the apparent position.

9. The method of claim 7, further comprising capturing the HMD image, via at least one HMD image sensor installed on the HMD, of a driver control area comprising a set of size-known markers arranged in a predetermined arrangement, wherein performing the analysis of the HMD sensor data further comprises identifying an apparent position and size of each member of the set of size-known markers in the HMD image, and wherein calculating the orientation is further based on the apparent position, the markers positioned in the driver control area that is visible to the at least one vehicle-mounted sensor.

10. A system for dynamically orienting a presentation of a head-mounted display (HMD), comprising:
    at least two image sensors including:
       at least one HMD image sensor which is installed on an HMD and worn by a driver of a vehicle that captures, from a location of the driver, an HMD image of a driver control area and a part of a windshield and a scenery seen through said part of said windshield and in front of said vehicle, the scenery including a real-world object having a first apparent position from a perspective of the at least one HMD image sensor; and
       at least one device image sensor of an imaging device mounted on a base fixated to said vehicle that captures a vehicle image of said scenery, the real-world object in the scenery having a second apparent position from a perspective of the at least one device image sensor; and
    an analysis and calculation module comprising instructions executable by a processor of the HMD to:
       perform an analysis of said HMD image and of said vehicle image to identify a difference in the first and second apparent positions of the real-world object located in said scenery and depicted both in said HMD image and in said vehicle image;
       calculate, based on said difference, an orientation of said HMD in relation to said vehicle using a calculation including one or more of correlation, transformation, and translation algorithms performed between the HMD image and the vehicle image; and adjust a presentation of data on a display of said HMD based on said orientation.

11. The system of claim 10, wherein adjusting the presentation of data on the display of the HMD based on the orientation comprises moving a location of a virtual object by an amount based on the difference between the first and second apparent positions of the real-world object responsive to determining that the data on the display comprises a virtual object tied to a real-world object inside of the vehicle.

12. The system of claim 10, wherein the HMD image includes a set of size-known markers arranged in a predetermined arrangement, and where performing the analysis of the HMD image comprises identifying an apparent position and size of each member of the set of size-known markers in the HMD image, the markers positioned in the driver control area that is visible to the device image sensor.

13. The system of claim 12, wherein identifying the apparent position and size of each member of the set of size-known markers comprises detecting the apparent position and size of each member of the set of size-known markers using a Scale-invariant feature transform (SIFT) process.

14. The system of claim 10, further comprising at least one HMD device motion detector configured to determine a current HMD device motion and at least one vehicle motion detector configured to determine a current vehicle motion, and wherein the instructions are further executable to calculate the orientation of the HMD relative to the vehicle based on a difference between the current HMD device motion and the current vehicle motion, and wherein the vehicle motion detector includes one or more of an accelerometer, a gyroscope, and a compass.

15. The system of claim 10, wherein the instructions are further executable to combine each of the HMD image and the vehicle image to create a stereoscopic image.

16. A system for dynamically orienting a presentation of a head-mounted display (HMD), comprising:
 a driver control area comprising a set of size-known markers arranged in a known arrangement;
 at least one HMD image sensor which is installed on an HMD worn by a driver of a vehicle that captures, when positioned on a head of the driver, an HMD image of the driver control area and a part of a windshield and a scenery seen through said part of said windshield and in front of said vehicle, and captures a marking image of said driver control area;
 at least one HMD device motion detector installed in said HMD that measures a current HMD device motion;
 at least one device image sensor of an imaging device mounted on a base fixated to said vehicle that captures a vehicle image of said scenery;
 at least one vehicle motion detector which is installed in said vehicle that measures a current vehicle motion; and
 an analysis and calculation module comprising instructions executable by a processor of at least one of the HMD and an in-vehicle computing system to:
  perform an analysis to identify: a difference in apparent position of an object located in said scenery and depicted both in said HMD image and in said vehicle image; a difference between said current vehicle motion and said current HMD device motion; and an apparent position and size of each member of said set of size-known markers in said marking image, the markers positioned in the driver control area that is visible to the device image sensor;
  calculate, based on said differences and said apparent position, an orientation of said HMD in relation to said vehicle; and
  adjust a presentation of data on a display of said HMD based on said orientation, the adjusted presentation of data maintaining a corrected position relative to the object located in the scenery based on a combination of the HMD image and the vehicle image.

17. The system of claim 16, wherein adjusting the presentation of data on the display of the HMD based on the orientation comprises moving a location of a virtual object by an amount based on the differences between the apparent position of the object and the current vehicle and HMD device motions responsive to determining that the data on the display comprises a virtual object tied to a real-world object inside of the vehicle.

18. The system of claim 16, wherein the HMD image includes a set of size-known markers arranged in a predetermined arrangement, and where performing the analysis comprises identifying an apparent position and size of each member of the set of size-known markers in the HMD image.

19. The system of claim 18, wherein identifying the apparent position and size of each member of the set of size-known markers in the HMD image comprises detecting the apparent position and size of each member of the set of size-known markers using a Scale-invariant feature transform (SIFT) process.

20. The system of claim 16, wherein the instructions are further executable to combine the HMD image and the vehicle image to create a stereoscopic image.

* * * * *